(12) United States Patent
Ganesh et al.

(10) Patent No.: US 9,900,039 B2
(45) Date of Patent: Feb. 20, 2018

(54) BACKGROUND PROCESS SCHEDULING METHOD AND APPARATUS FOR OPTIMIZING SPECIFIC ABSORPTION RATE

(71) Applicant: QUALCOMM Incorporated, San Diego, CA (US)

(72) Inventors: Shriram Ganesh, San Diego, CA (US); Babak Forutanpour, Carlsbad, CA (US); Lin Lu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/723,711

(22) Filed: May 28, 2015

(65) Prior Publication Data
US 2016/0352379 A1    Dec. 1, 2016

(51) Int. Cl.
| | |
|---|---|
| *H04W 4/00* | (2009.01) |
| *G06F 9/46* | (2006.01) |
| *H04B 1/38* | (2015.01) |
| *H04B 1/3827* | (2015.01) |

(52) U.S. Cl.
CPC ............ *H04B 1/3838* (2013.01); *G06F 9/46* (2013.01); *H04W 4/003* (2013.01)

(58) Field of Classification Search
CPC .......... G06F 9/462; G06F 9/46; H04W 4/003; H04W 4/02; H04W 4/22; H04W 8/18; H04B 1/3838; H04B 1/7105
USPC ............... 455/226.1, 414.1, 522, 405, 575.5; 370/328–329, 259; 718/100, 101
See application file for complete search history.

(56) References Cited

U.S. PATENT DOCUMENTS

| | | | | |
|---|---|---|---|---|
| 6,011,510 A | * | 1/2000 | Yee | G01S 5/0027 342/357.55 |
| 2009/0047998 A1 | | 2/2009 | Alberth, Jr. | |
| 2009/0325512 A1 | * | 12/2009 | Granlund | H04L 47/14 455/91 |
| 2011/0059706 A1 | | 3/2011 | Harel et al. | |

(Continued)

FOREIGN PATENT DOCUMENTS

| | | | | |
|---|---|---|---|---|
| EP | 1229664 | * | 8/2002 | H04B 1/38 |
| EP | 1229664 A1 | | 8/2002 | |

OTHER PUBLICATIONS

International Search Report and Written Opinion—PCT/US2016/033324—ISA/EPO—Aug. 19, 2016.

*Primary Examiner* — Inder Mehra
(74) *Attorney, Agent, or Firm* — Loza & Loza, LLP/Qualcomm (57) ABSTRACT

Embodiments described herein provide a method for scheduling background processes. The method begins when a task scheduler requests a SAR severity level from the application processor. The application processor then requests the SAR severity level from the modem. Upon receipt of the SAR severity level the task scheduler then determines if the SAR severity level is high. If the SAR severity level is high, the task scheduler waits a predetermined time and then requests a further SAR severity level. This process continues until the SAR severity level returned in within a normal level. At that time, the background process is scheduled. This prioritizes transmission. The apparatus includes a task scheduler in communication with an application processor and a modem in communication with the application processor. The task scheduler may include a memory and a timer.

17 Claims, 8 Drawing Sheets

(56) References Cited

U.S. PATENT DOCUMENTS

| | | |
|---|---|---|
| 2011/0105888 A1 | 5/2011 | Arai |
| 2011/0222469 A1 | 9/2011 | Ali et al. |
| 2013/0122827 A1* | 5/2013 | Ali ................... H04B 1/3838 455/77 |
| 2013/0178167 A1* | 7/2013 | Lockerbie ............ H04B 1/3838 455/63.4 |
| 2014/0274189 A1* | 9/2014 | Moller ................ H04W 52/367 455/522 |
| 2015/0236742 A1* | 8/2015 | Peitzer ................ H04B 1/3838 455/522 |
| 2015/0295613 A1* | 10/2015 | Kim .................... H04B 1/3838 455/550.1 |
| 2016/0164563 A1* | 6/2016 | Khawand ............ H04B 1/3838 455/127.2 |

* cited by examiner

BACKGROUND PROCESS SCHEDULING METHOD AND APPARATUS FOR OPTIMIZING SPECIFIC ABSORPTION RATE

FIELD

The present disclosure relates generally to wireless communication systems, and more particularly to a method and apparatus for background process scheduling to optimize specific absorption rate.

BACKGROUND

Wireless communication devices have become smaller and more powerful as well as more capable. Increasingly users rely on wireless communication devices for mobile phone use as well as email and Internet access. At the same time, devices have become smaller in size. Devices such as cellular telephones, personal digital assistants (PDAs), laptop computers, and other similar devices provide reliable service with expanded coverage areas. Such devices may be referred to as mobile stations, stations, access terminals, user terminals, subscriber units, user equipments, and similar terms.

A wireless communication system may support communication for multiple wireless communication devices at the same time. In use, a wireless communication device may communicate with one or more base stations by transmissions on the uplink and downlink. Base stations may be referred to as access points, Node Bs, or other similar terms. The uplink or reverse link refers to the communication link from the wireless communication device to the base station, while the downlink or forward link refers to the communication from the base station to the wireless communication devices.

Wireless communication systems may be multiple access systems capable of supporting communication with multiple users by sharing the available system resources, such as bandwidth and transmit power. Examples of such multiple access systems include code division multiple access (CDMA) systems, time division multiple access (TDMA) systems, frequency division multiple access (FDMA) systems, wideband code division multiple access (WCDMA) systems, global system for mobile (GSM) communication systems, enhanced data rates for GSM evolution (EDGE) systems, and orthogonal frequency division multiple access (OFDMA) systems.

Wireless devices, including mobile telephones are required to undergo testing to determine the amount of RF energy a user may be exposed to when using the device. In the U.S., the Federal Communications Commission (FCC) certifies mobile devices to ensure compatibility with requirements and user safety. The maximum power that a mobile device may use when transmitting is affected by the fact that users position the device against their head and body. The close proximity or contact is behind the FCC requirements setting limits on the specific absorption rate. SAR is defined as the power absorbed per unit mass of tissue in mW/g by regulatory bodies, including the FCC. Current FCC testing requirements allow for a finite separation distance between the smartphone and the torso portion of a human phantom. In the United States, the FCC limits SAR to 1.6 W/kg as averaged over any 1 gram of tissue for a localized exposure.

In the European Union the Comité Européen de Normalisation Électrotechnique (CENELEC), or European Committee for Electrotechnical Standardization. CENELEC limits SAR to 2 W/kg averaged over 10 grams of tissue for localized exposure. Maximum average power levels are used to determine SAR compliance. SAR values are specified by the International Commission on Non-Ionizing Radiation Protection (ICNIRP) and are to be averaged over any six minute period. ICNIRP determines exposure limits for electromagnetic fields used by devices such as cell phones.

As mobile devices become more popular, and with increasing use of smartphones, users frequently run applications on the device. Applications may run in the background for a number of reasons, and users may be unaware that an application is running in the background. SAR limits may limit transmission when applications are running in the background and the SAR usage within the six minute window is close to the maximum. There is a need in the art for a method and apparatus to schedule background processes with knowledge of SAR measurements.

SUMMARY

Embodiments described herein provide a method for scheduling background processes. The method begins when a task scheduler requests a SAR severity level from the application processor. The application processor then requests the SAR severity level from the modem. Upon receipt of the SAR severity level the task scheduler then determines if the SAR severity level is high. If the SAR severity level is high, the task scheduler waits a predetermined time and then requests a further SAR severity level. This process continues until the SAR severity level returned in within a normal level. At that time, the background process is scheduled. This prioritizes transmission.

A further embodiment provides an apparatus for scheduling background processes. The apparatus includes a task scheduler in communication with an application processor and a modem in communication with the application processor. The task scheduler may include a memory and a timer.

A still further embodiment provides an apparatus for scheduling background processes. The apparatus includes: means for requesting a SAR severity level, means for determining if the SAR severity level is high; means for waiting a predetermined duration, means for repeating requesting the SAR severity level step and the determining if the SAR severity level is high steps until a SAR severity level is acceptable; and means for scheduling a background process.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

As used in this application, the terms "component," "module," "system," and the like are intended to refer to a computer-related entity, either hardware, firmware, a combination of hardware and software, software, or software in execution. For example, a component may be, but is not limited to being, a process running on a processor, an integrated circuit, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network, such as the Internet, with other systems by way of the signal).

Furthermore, various aspects are described herein in connection with an access terminal and/or an access point. An access terminal may refer to a device providing voice and/or data connectivity to a user. An access wireless terminal may be connected to a computing device such as a laptop computer or desktop computer, or it may be a self-contained device such as a cellular telephone. An access terminal can also be called a system, a subscriber unit, a subscriber station, mobile station, mobile, remote station, remote terminal, a wireless access point, wireless terminal, user terminal, user agent, user device, or user equipment. A wireless terminal may be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. An access point, otherwise referred to as a base station or base station controller (BSC), may refer to a device in an access network that communicates over the air-interface, through one or more sectors, with wireless terminals. The access point may act as a router between the wireless terminal and the rest of the access network, which may include an Internet Protocol (IP) network, by converting received air-interface frames to IP packets. The access point also coordinates management of attributes for the air interface.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ), and integrated circuits such as read-only memories, programmable read-only memories, and electrically erasable programmable read-only memories.

Various aspects will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Other aspects, as well as features and advantages of various aspects, of the present invention will become apparent to those of skill in the art through consideration of the ensuring description, the accompanying drawings and the appended claims.

Figure 1:
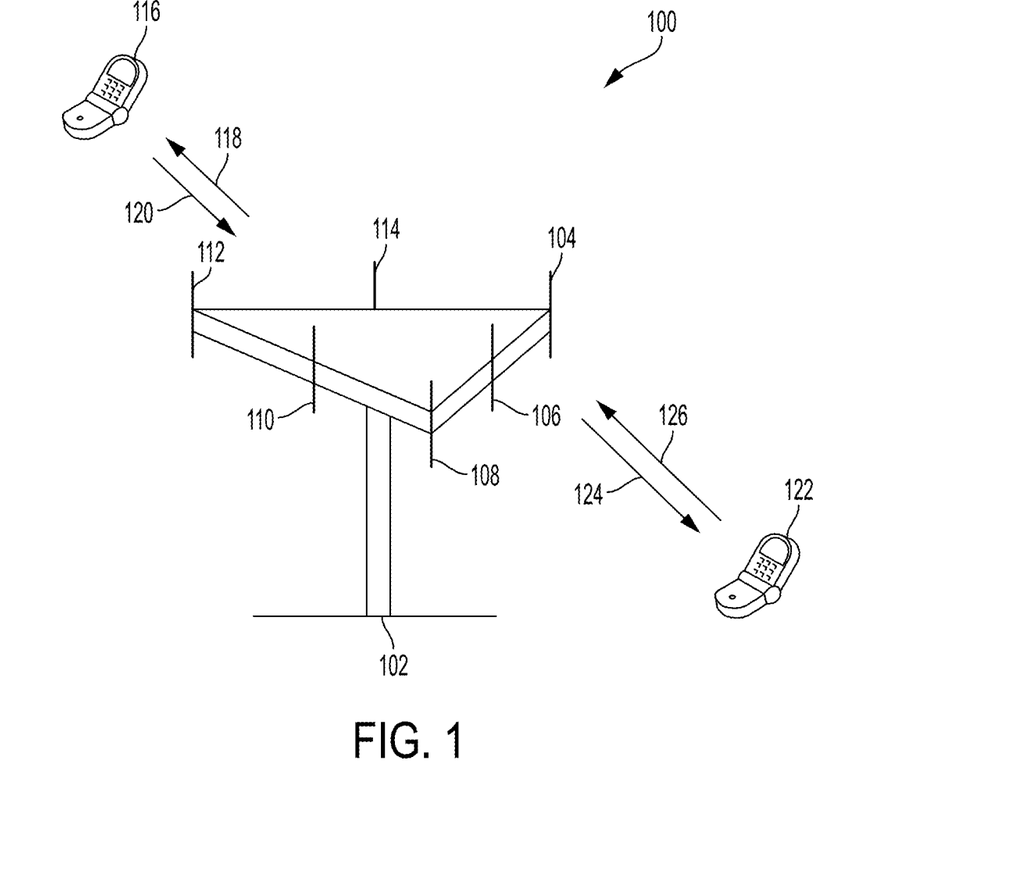
FIG. 1 illustrates a wireless multiple-access communication system, in accordance with certain embodiments of the disclosure.

FIG. 1 illustrates a multiple access wireless communication system 100 according to one aspect. An access point 102 (AP) includes multiple antenna groups, one including 104 and 106, another including 108 and 110, and an additional one including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over downlink or forward link 118 and receive information from access terminal 116 over uplink or reverse link 120. Access terminal 122 is in communication with antennas 106 and 108, where antennas 106 and 108 transmit information to access terminal 122 over downlink or forward link 124, and receive information from access terminal 122 over uplink or reverse link 126. In a frequency division duplex (FDD) system, communication link 118, 120, 124, and 126 may use a different frequency for communication. For example, downlink or forward link 118 may use a different frequency than that used by uplink or reverse link 120.

Each group of antennas and/or the area in which they are designed to communicate is often referred to as a sector of the access point. In an aspect, antenna groups are each designed to communicate to access terminals in a sector of the areas covered by access point 102.

In communication over downlinks or forward links 118 and 124, the transmitting antennas of an access point utilize beamforming in order to improve the signal-to-noise ration (SNR) of downlinks or forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as a Node B, an evolved Node B (eNB), or some other terminology. An access terminal may also be called a mobile station, user equipment (UE), a wireless communication device, terminal or some other terminology. For certain aspects, either the AP 102, or the access terminals 116, 122 may utilize the techniques described below to improve performance of the system.

Figure 2:
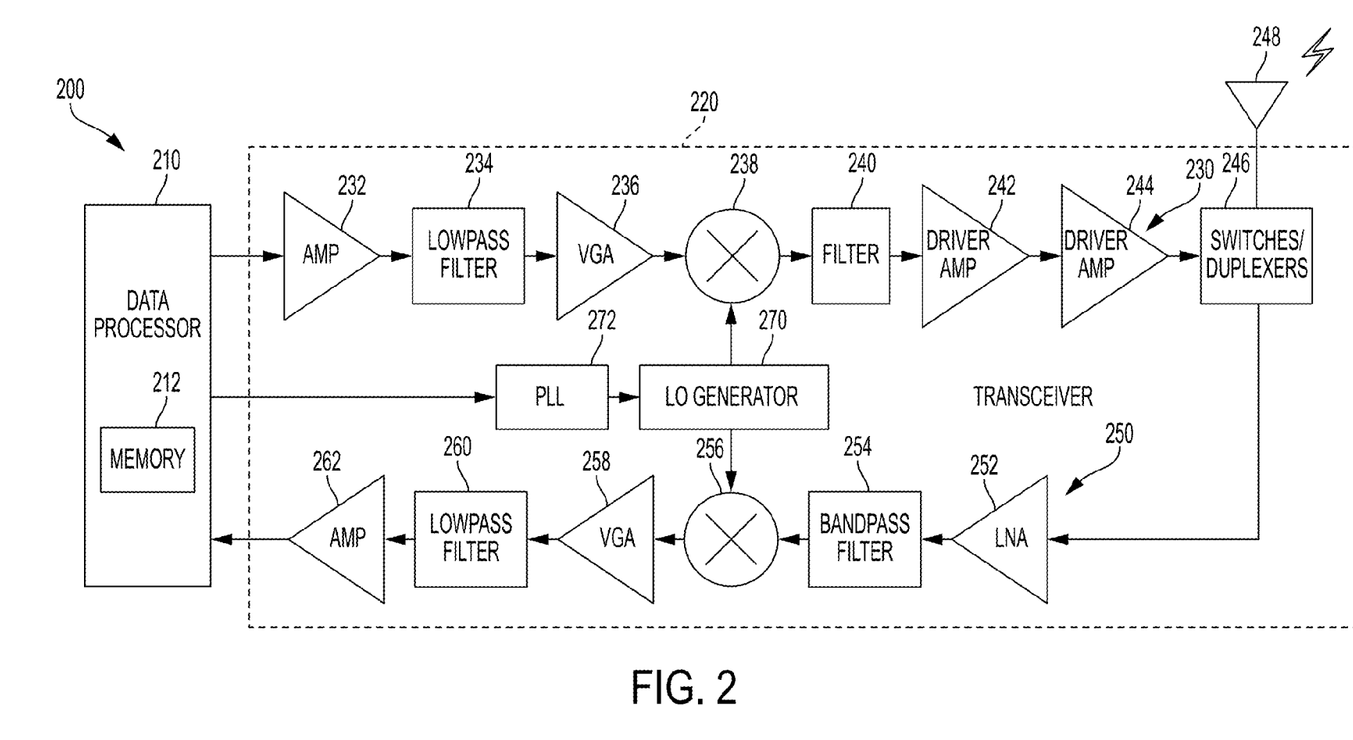
FIG. 2 is a block diagram of a wireless communication system in accordance with embodiments of the disclosure.

FIG. 2 shows a block diagram of an exemplary design of a wireless communication device 200. In this exemplary design, wireless device 200 includes a data processor 210 and a transceiver 220. Transceiver 220 includes a transmitter 230 and a receiver 250 that support bi-directional wireless communication. In general, wireless device 200 may include any number of transmitters and any number of receivers for any number of communication systems and any number of frequency bands.

In the transmit path, data processor 210 processes data to be transmitted and provides an analog output signal to transmitter 230. Within transmitter 230, the analog output signal is amplified by an amplifier (Amp) 232, filtered by a lowpass filter 234 to remove images caused by digital-to-analog conversion, amplified by a VGA 236, and upconverted from baseband to RF by a mixer 238. The upconverted signal is filtered by a filter 240, further amplified by a driver amplifier, 242 and a power amplifier 244, routed through switches/duplexers 246, and transmitted via an antenna 248.

In the receive path, antenna 248 receives signals from base stations and/or other transmitter stations and provides a received signal, which is routed through switches/duplexers 246 and provided to receiver 250. Within receiver 250, the received signal is amplified by an LNA 252, filtered by a bandpass filter 254, and downconverted from RF to baseband by a mixer 256. The downconverted signal is amplified by a VGA 258, filtered by a lowpass filter 260, and amplified by an amplifier 262 to obtain an analog input signal, which is provided to data processor 210.

FIG. 2 shows transmitter 230 and receiver 250 implementing a direct-conversion architecture, which frequency converts a signal between RF and baseband in one stage. Transmitter 230 and/or receiver 250 may also implement a super-heterodyne architecture, which frequency converts a signal between RF and baseband in multiple stages. A local oscillator (LO) generator 270 generates and provides transmit and receive LO signals to mixers 238 and 256, respectively. A phase locked loop (PLL) 272 receives control information from data processor 210 and provides control signals to LO generator 270 to generate the transmit and receive LO signals at the proper frequencies.

FIG. 2 shows an exemplary transceiver design. In general, the conditioning of the signals in transmitter 230 and receiver 250 may be performed by one or more stages of amplifier, filter, mixer, etc. These circuits may be arranged differently from the configuration shown in FIG. 2. Some circuits in FIG. 2 may also be omitted. All or a portion of transceiver 220 may be implemented on one or more analog integrated circuits (ICs), RF ICs (RFICs), mixed-signal ICs, etc. For example, amplifier 232 through power amplifier 244 in transmitter 230 may also be implemented on an RFIC. Driver amplifier 242 and power amplifier 244 may also be implemented on another IC external to the RFIC.

Data processor 210 may perform various functions for wireless device 200, e.g., processing for transmitter and received data. Memory 212 may store program codes and data for data processor 210. Data processor 210 may be implemented on one or more application specific integrated circuits (ASICs) and/or other ICs.

Wireless devices, such as mobile phones used in the network described above in FIG. 1 generate transmit power that, at high levels, may harm users. This transmit power is used to access the network and is generated by the transmit chain described in FIG. 2. The transmit power of the mobile device at high levels is capable of adversely affecting human health and safety.

SAR is a measure of the rate at which energy is absorbed by the human body when exposed to an RF electromagnetic field. SAR is defined as the power absorbed per mass of tissue, and has units of watts per kilogram (W/Kg). SAR may be either averaged over the entire body, known as whole body exposure, or averaged over a smaller sample volume (typically 1 g or 10 g of tissue), known as localized exposure. The resulting value cited is the maximum level measured in the body part studied over the stated volume or mass.

The SAR for electromagnetic energy may be calculated from the electric field within the tissue as:

$$SAR = \int_{sample} \frac{\sigma(r)|E(r)|^2}{\rho(r)} dr$$

where σ is the sample electrical conductivity

E is the root mean square (RMS) electric field

ρ is the sample density r covers the sample region of the body

SAR measures exposure to RF fields between 100 kHz and 10 GHz (generally known as radio waves). It is commonly used to measure the power absorbed by the human body. The SAR value is significantly dependent on the geometry of the body part exposed to the RF energy, and also on the exact location and geometry of the RF source. As a result, each mobile device model must be tested with each specific source at the intended use position.

When measuring the SAR of a wireless device the device is placed at the head in a talk position or flat next to the body phantom. The SAR value is then measured at the location with the highest absorption rate. Typically, for a wireless device, the highest values are generated near the antenna. SAR values depend heavily on the size of the averaging volume.

The maximum transmit power a mobile device may use when transmitting in close proximity with humans is dictated by the limit set on SAR, that is, the power absorbed per unit of mass in tissue in mW/g. This limit is set by various regulatory bodies worldwide. In the U.S., the FCC sets SAR limits for mobile device transmitters. In the European Union CENELEC performs a similar function.

Figure 3:
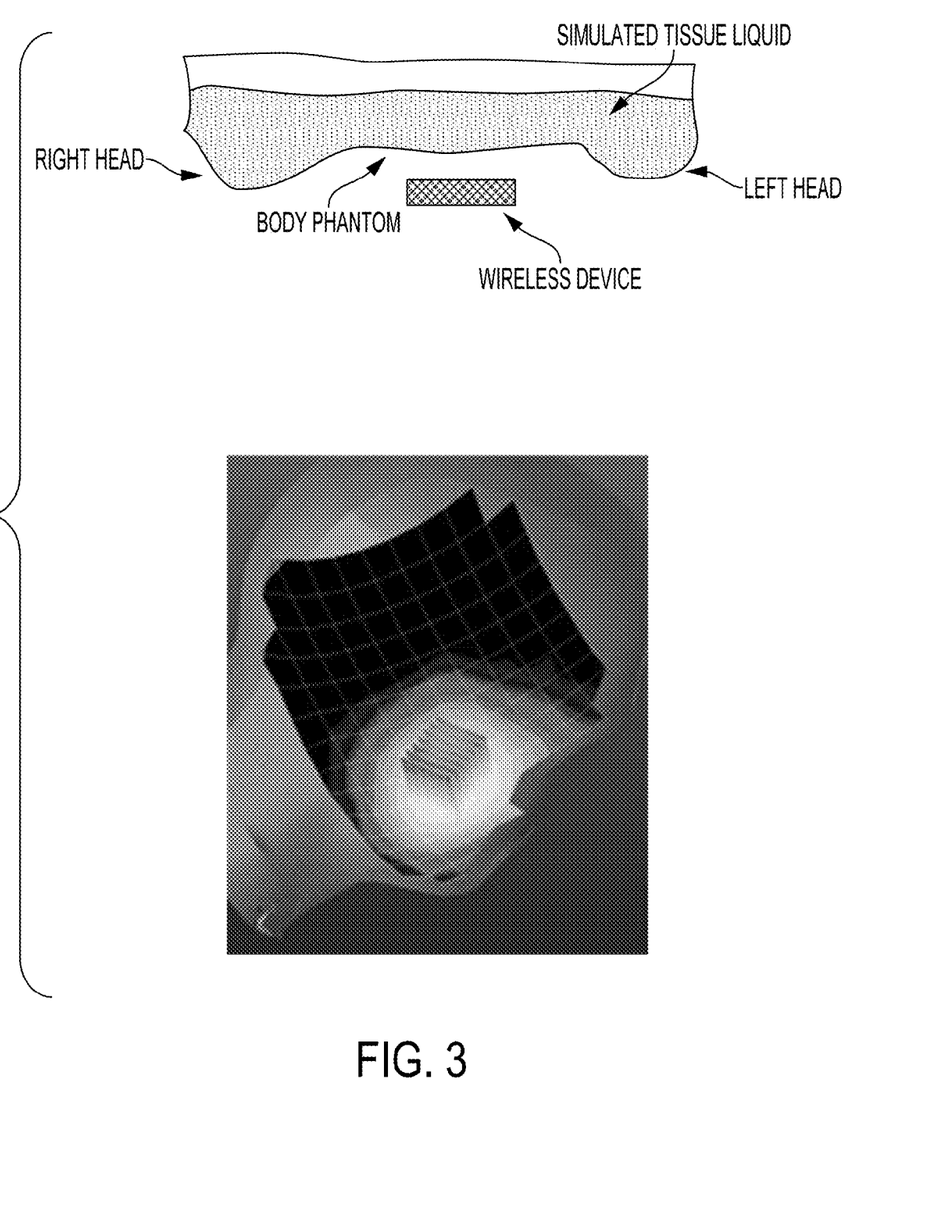
FIG. 3 illustrates a human phantom used for SAR testing and also illustrates a SAR distribution of a transmitter in accordance with embodiments of the disclosure.

For the body phantom SAR, current FCC testing allows for a finite separation distance between the smartphone device and a human phantom. FIG. 3 depicts the SAR measurement set up with a body phantom. At present, testing allows for a finite separation distance between the mobile device and the body phantom of approximately 10 mm. At this separation distance a mobile phone may transmit at a desired power level. This transmit power level may be affected by a number of factors, including power needed for the transmission, signal quality, and applications running in the background.

Applications may be running the background for a variety of reasons, including application updates, pinging to check server for updates, uploading pictures when the user device is on cellular network as soon as the device is on a local wireless network, such as WIFI. As one example, a user may upload pictures to a social media site only when the device is connected to a WiFi network or other similar network.

Figure 4:
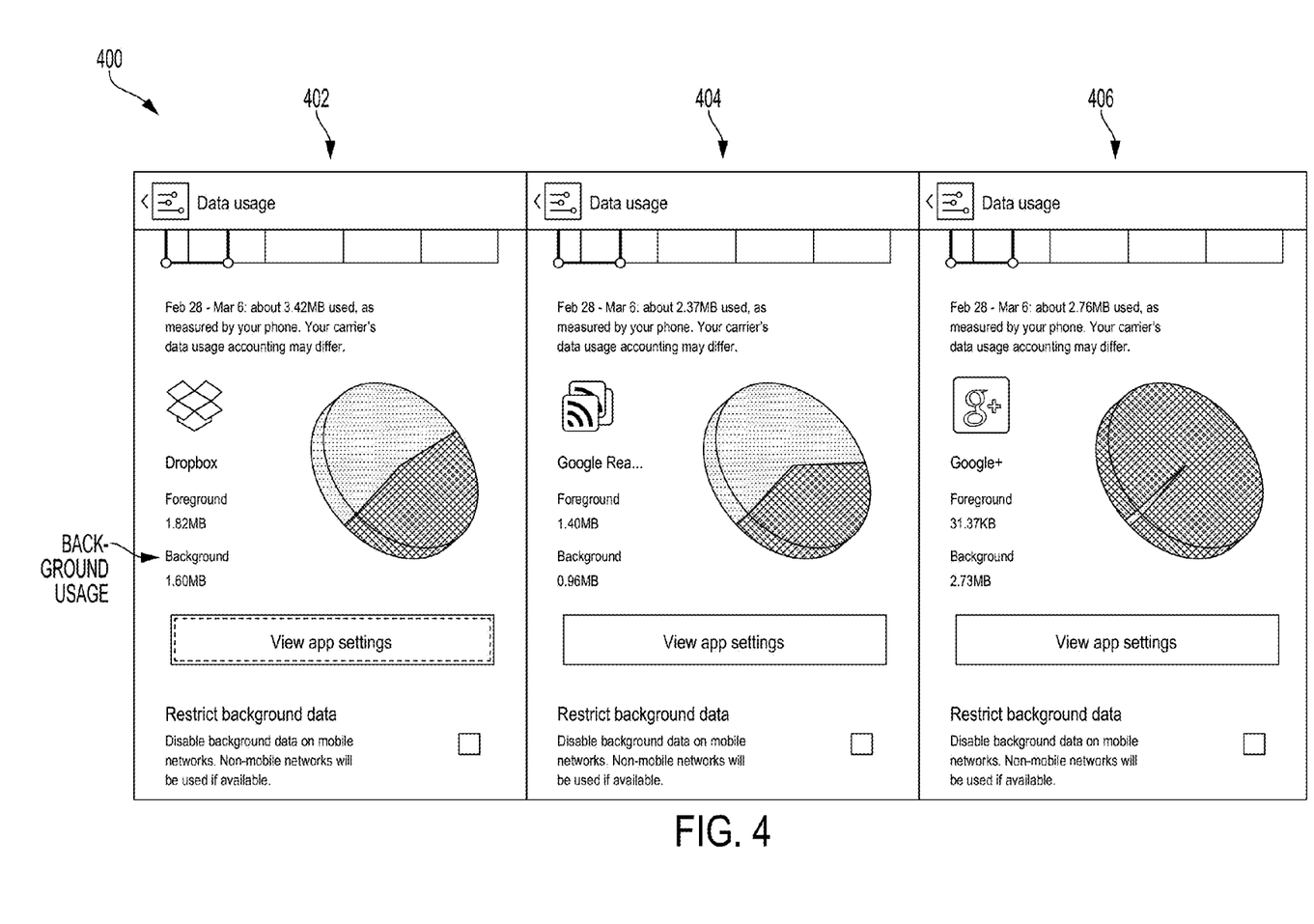
FIG. 4 shows some example applications that may be running in the background on a user's device, in accordance with embodiments of the disclosure.

FIG. 4 shows a number of applications that may be running in the background on a user's device. The operations system 400 may display the applications that are running in the background. In FIG. 4 the device operating system 400 has three applications open. Application 402 is a Dropbox application, application 404 is a Google Reader application, and application 406 is a Google application. Other programs may be used, and other operating systems other than what is depicted in FIG. 4 may be used. A user device may have more than three applications running in the background.

The applications running in the background and shown in FIG. 4 may limit transmission. For user safety a lower SAR is better. Once a user device reaches the maximum SAR allowed by the regulations in the area where the device is operating, the device may not transmit until the start of the next time window. In many cases, the time window is six minutes. If a background process is scheduled to run at a time when the current SAR value is near the maximum permitted SAR value, then the device may not transmit further.

Embodiments described here provide a SAR aware task scheduler that is made aware of SAR measurements and uses them to prioritize usage on the device. When scheduling a background process the task scheduler queries the modem for the SAR values. The modem responds with a response message that may be formatted Response_SAR_Measure(Severity Level s, Duration t). This provides the time left in the six minute SAR window. If the severity level is determined to be less than high, then the background process may be scheduled. If the severity level is determined to be at or near the maximum level, then a predetermined wait time is allowed to elapse before the background process is scheduled.

The modem may notify the application processor whenever there is an increase in the SAR value beyond a normal severity in a time window t. The severity level and the time window may be predetermined for a given operating system and maximum allowable SAR value. If the task scheduler has scheduled a background process in the same time window, the scheduler postpones the running of the background process to a duration t+x, where x is a fine tuning value. X may be based on the specific device and may take network characteristics into account.

Figure 5:
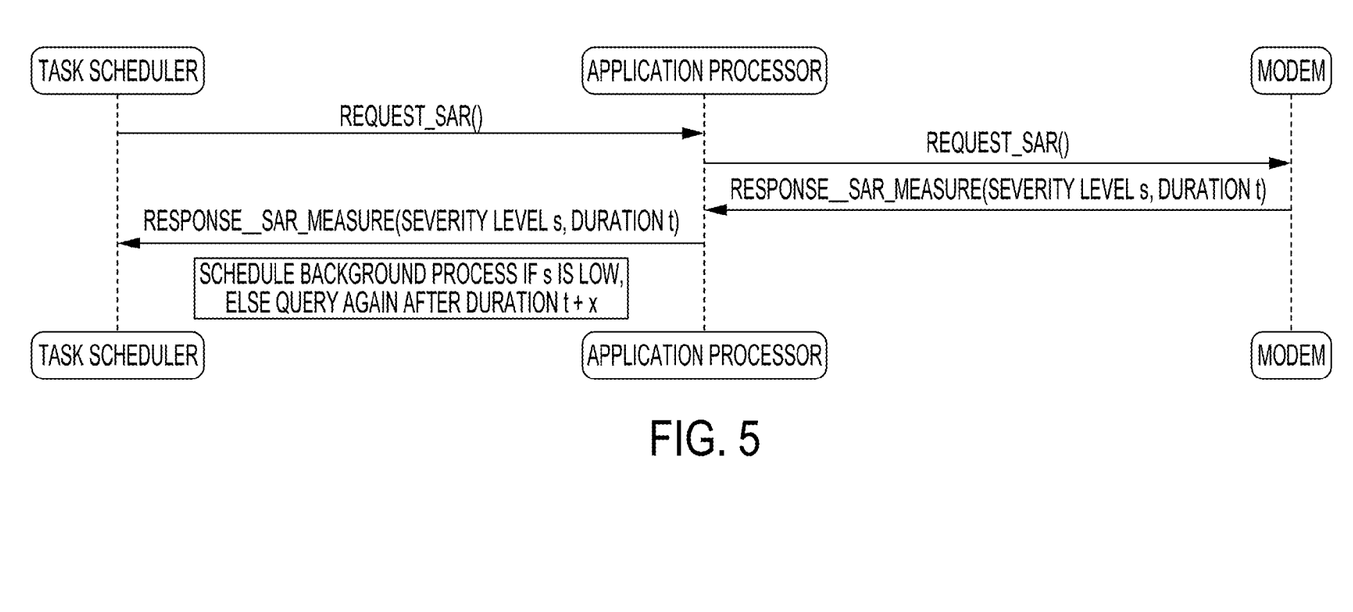
FIG. 5 depicts call flow when SAR aware background process scheduling is used in accordance with embodiments of the disclosure.

FIG. 5 illustrates the call flow in a SAR aware background process scheduling method. A task scheduler sends a Request_SAR$_0$ message to the application processor. The application processor then sends a Request_SAR$_0$ to the modem. The modem responds with a Response_SAR_Measure(Severity Level s, Duration t) message to the application processor. The modem may include SAR measuring devices or apparatus to perform this function, or may receive this information from an outside source. The application processor then sends the Response_SAR_Measure(Severity Level s, Duration t) message to the task scheduler. The task scheduler will schedule the background process if s is low. If s is high, then the query is repeated after a duration of time, t+x, has elapsed. The task scheduler may include a timer function to measure the duration, and this timer function may also include provisions for fine tuning of the wait duration by an adjustment factor, Ax.

Figure 6:
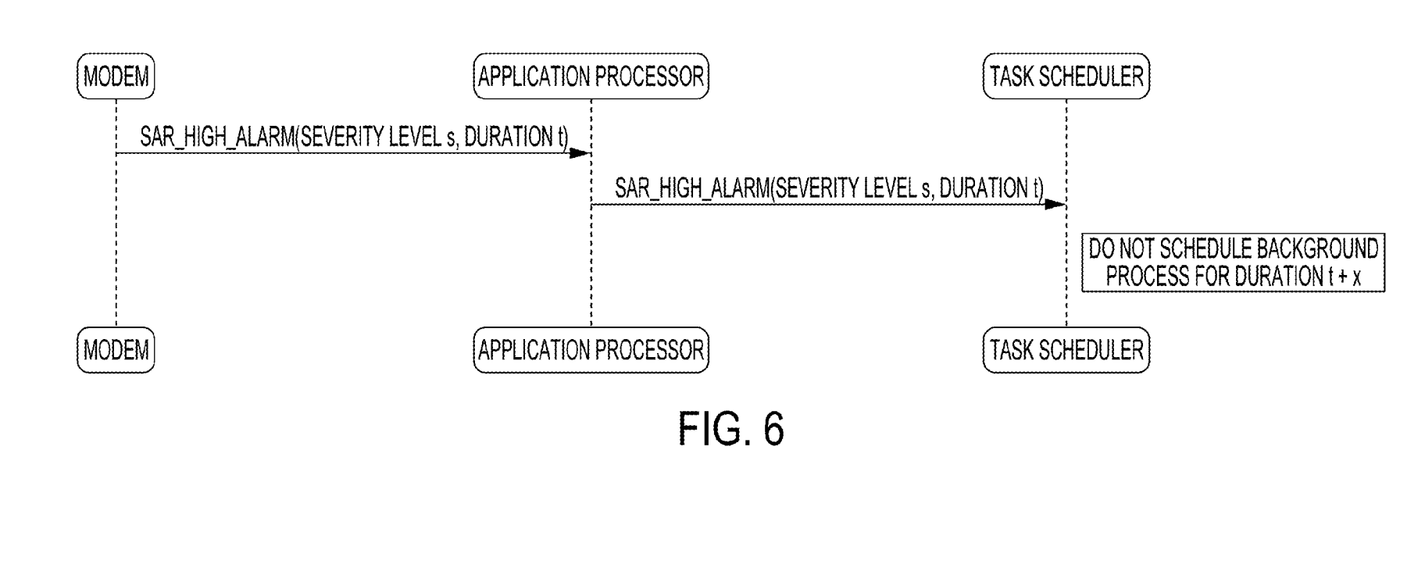
FIG. 6 illustrates call flow when SAR is close to peak permissible value for a six minute window, in accordance with embodiments described herein.

FIG. 6 illustrates the call flow of an additional embodiment where the SAR value is close to the maximum allowed or peak value for the six minute window. The call flow begins when the modem sends an alarm message, SAR_High_Alarm(Severity Level s, Duration t), to the application processor. The application processor then sends the SAR_High_Alarm(Severity Level s, Duration t) message to the task scheduler. The task scheduler does not schedule the background process for a specified time duration, t+x. After the specified time duration has elapsed the background process may be scheduled. The task scheduler may contain a memory for retaining SAR severity value limits and duration adjustment factors.

Figure 7:
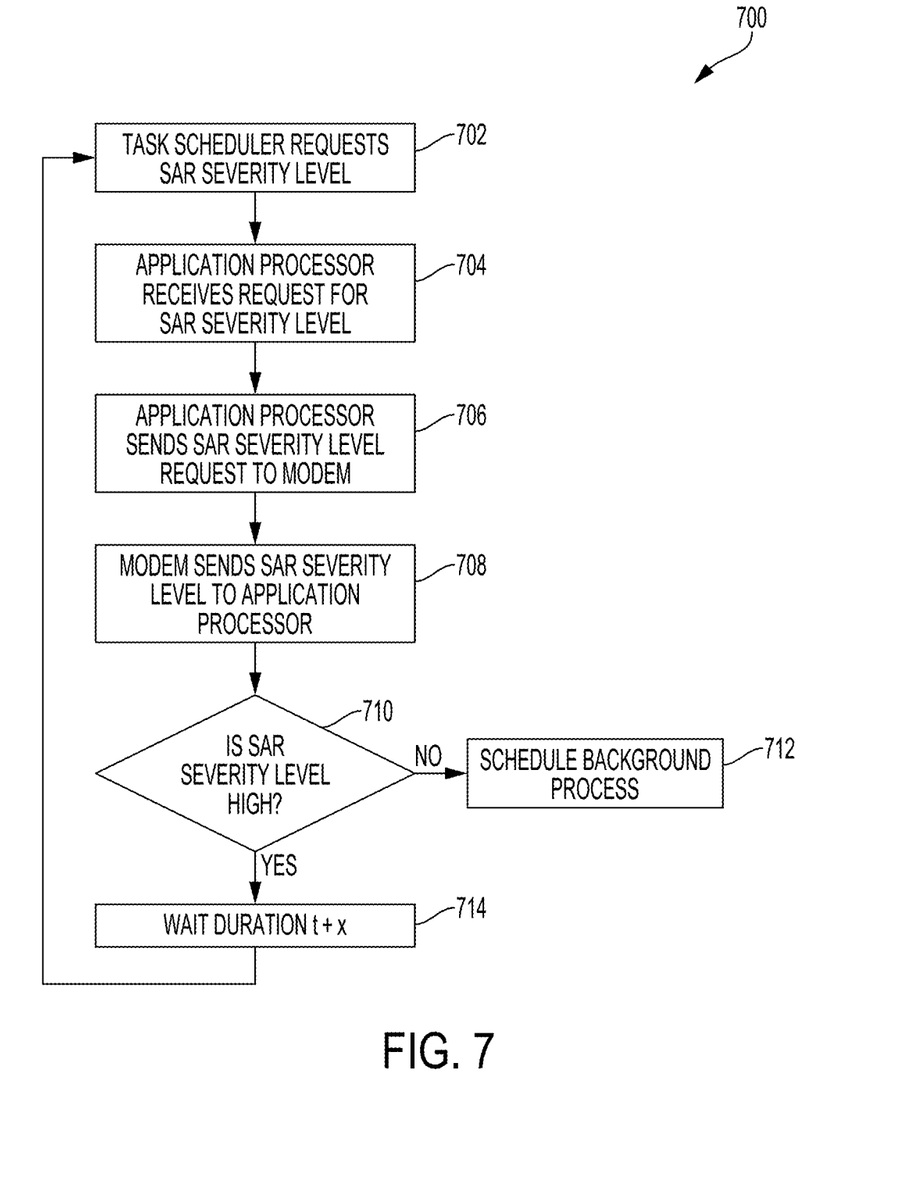
FIG. 7 is a flowchart of the method of SAR aware background process scheduling method in accordance with embodiments described herein.

FIG. 7 is a flowchart of a method of SAR aware background process scheduling. The method 700 begins with step 702 when the task scheduler requests the current SAR severity level from the application processor. In step 704 the application processor receives the request for the current SAR severity level and forwards the request to the modem in step 706. The modem provides the SAR severity level to the application processor in step 708. The task scheduler analyzes the SAR severity level in step 710. If the SAR severity level is not high, then in step 712, the background process is scheduled. If the SAR severity level is high, then in step 714 a wait duration of t+x is allowed to pass and the background process is not scheduled. After the wait duration the process loops back to step 702 where a new request for the SAR severity level is made. This process continues until the background process may be scheduled.

Figure 8:
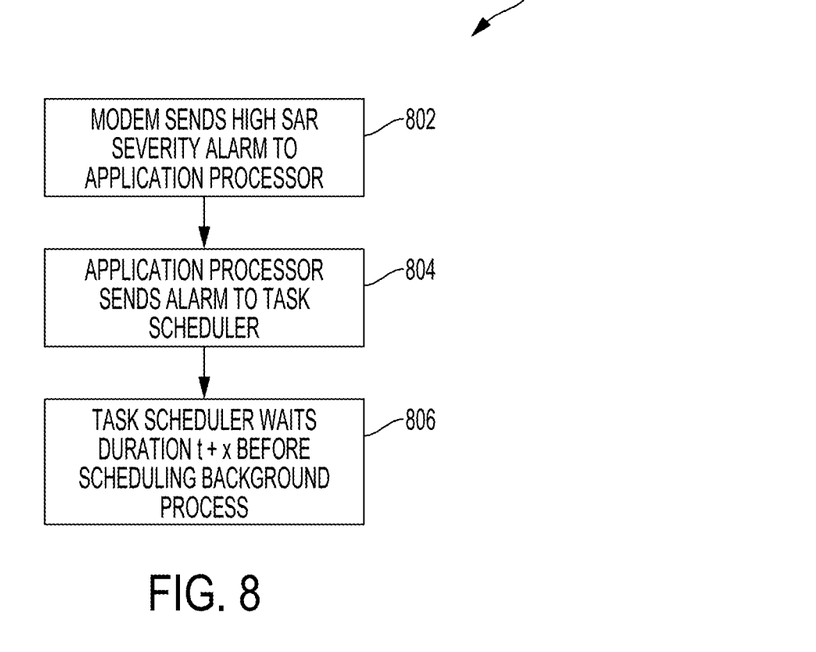
FIG. 8 is a flowchart of an alternate embodiment of a SAR aware background process scheduling method in accordance with embodiments described herein.

FIG. 8 is a flowchart of an alternate embodiment of a method for SAR aware background process scheduling. The method 800 begins with step 802 when the modem sends a HIGH SAR alarm to the application processor. In step 804 the application processor sends the HIGH SAR alarm to the task scheduler. The task scheduler then delays scheduling the background process for a duration t+x in step 806.

Figure 9:
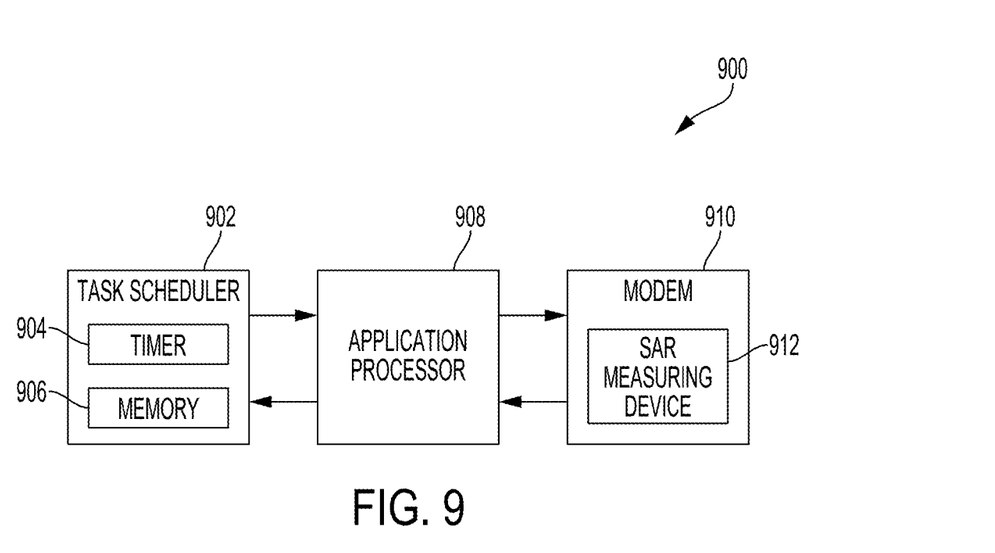
FIG. 9 is a block diagram of an apparatus for scheduling background processes, in accordance with embodiments described herein.

FIG. 9 is a block diagram of an apparatus for scheduling background processes, 900. The apparatus 900 includes a task scheduler 902 in communication with an application processor 908. The application processor 908 is in communication with a modem 910. Task scheduler 902 includes timer 904 and memory 906. Modem 910 includes a SAR measuring device which may provide real-time SAR measurements or calculations based on the operation of the modem.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitter over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM EEPROM, CD-ROM or other optical disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A method of scheduling background processes, comprising:
   requesting a specific absorption rate (SAR) severity level;
   determining if the SAR severity level is above a predetermined SAR regulatory limit;
   waiting a predetermined duration if the SAR severity level is above the predetermined SAR regulatory limit, wherein the predetermined duration is based on a measurement time window and the predetermined SAR regulatory limit;
   repeating the requesting the SAR severity level step and the determining if the SAR severity level is above the predetermined SAR regulatory limit until the SAR severity level is below the predetermined SAR regulatory limit; and
   scheduling a background process, based on the SAR severity level, wherein scheduling the background process prioritizes maintaining a transmission.

2. The method of claim 1, where the predetermined duration is a measurement time window and an additional fine tuning increment of time.

3. The method of claim 1, where the SAR severity levels are predetermined and based on measurements taken within a measurement time window.

4. The method of claim 3, where the additional fine tuning factor is determined for a particular device and network.

5. The method of claim 1, further comprising:
   sending an alarm message when the SAR severity value increases beyond a predetermined normal level;
   postponing any scheduled background processes for a specified duration of time; and
   scheduling the background processes when the SAR value is within the predetermined normal level.

6. The method of claim 5, where the specified duration of time includes a fine tuning factor.

7. The method of claim 6, where the fine tuning factor is determined for a particular device and network.

8. An apparatus for scheduling background processes, comprising:
   a task scheduler in communication with a processor, wherein the task scheduler is configured to schedule background processes based on a SAR severity level; and
   a modem in communication with the processor.

9. The apparatus of claim 8, wherein the task scheduler includes a timer.

10. The apparatus of claim 9, wherein the timer includes a fine tuning adjustment.

11. The apparatus of claim 10, wherein the task scheduler includes a memory.

12. The apparatus of claim 8, wherein the modem includes a specific absorption rate (SAR) measuring device.

13. An apparatus for scheduling background processes, comprising:
   means for requesting a specific absorption rate (SAR) severity level;
   means for determining if the SAR severity level is above a predetermined SAR regulatory limit;
   means for waiting a predetermined duration if the SAR severity level is above the predetermined SAR regulatory limit, wherein the predetermined duration is based on a measurement time window and the predetermined SAR regulatory limit;
   means for repeating the SAR severity level step and the determining if the SAR severity level is above the predetermined SAR regulatory limit until the SAR severity level is below the predetermined SAR regulatory limit; and
   means for scheduling a background process based on the SAR severity level, wherein the means for scheduling the background process prioritizes maintaining a transmission.

14. The apparatus of claim 13, wherein the means for waiting a predetermined duration of time includes a means for determining an additional fine tuning increment of time.

15. The apparatus of claim 13, further comprising:
   means for sending an alarm message when the SAR severity value increases beyond a predetermined normal level;
   means for postponing any scheduled background processes for a specified period of time; and
   means for scheduling the background processes when the SAR value is within the predetermined normal level.

16. The apparatus of claim 13, further comprising means for storing the predetermined normal SAR level.

17. The apparatus of claim 16, wherein the means for storing the predetermined normal SAR level also stores the fine tuning value.

* * * * *